United States Patent
Van Den Berg

(10) Patent No.: US 7,457,388 B2
(45) Date of Patent: Nov. 25, 2008

(54) REDUNDANT SYNCHRONOUS CLOCK DISTRIBUTION SYSTEM

(75) Inventor: Eric Van Den Berg, Nijlen (BE)

(73) Assignee: Alcatel, Paris (FR)

( * ) Notice: Subject to any disclaimer, the term of this patent is extended or adjusted under 35 U.S.C. 154(b) by 423 days.

(21) Appl. No.: 11/289,329

(22) Filed: Nov. 30, 2005

(65) Prior Publication Data
US 2006/0139081 A1 Jun. 29, 2006

(30) Foreign Application Priority Data
Dec. 23, 2004 (EP) ................... 04293126

(51) Int. Cl.
*H04L 7/00* (2006.01)
(52) U.S. Cl. .............. 375/354; 375/356; 375/357
(58) Field of Classification Search .......... 375/354, 375/356, 371, 373, 376, 357; 370/503
See application file for complete search history.

(56) References Cited

U.S. PATENT DOCUMENTS 6,204,732 B1 * 3/2001 Rapoport et al. .......... 331/2
6,675,307 B1 * 1/2004 Heitkamp et al. .......... 713/401
6,757,350 B1 * 6/2004 Chesavage ................ 375/376
2007/0229128 A1 * 10/2007 Nakamuta et al. .......... 327/156

FOREIGN PATENT DOCUMENTS

WO  WO 00/22763 A  4/2000
WO  WO 03/044996 A  5/2003

* cited by examiner

Primary Examiner—Tesfaldet Bocure
(74) Attorney, Agent, or Firm—Sughrue Mion, PLLC

(57) ABSTRACT

A redundant synchronous clock distribution system is provided comprising at least a first and a second clock module and first and second clock distribution branches adapted for synchronizing at least one clock slave module connected downstream to the redundant synchronous clock distribution system. Each of the first and second clock modules are adapted to act as a master clock module or a slave clock module. A clock switchover module is adapted to switch each of the first and second clock modules to change between the master mode and the slave mode. The clock switchover module comprises a flip-flop-circuit having a first circuit part and a second circuit part, wherein the first circuit part is located on the first clock module and the second circuit part is located on the second clock module.

14 Claims, 2 Drawing Sheets

| | |
|---|---|
| CB-A, CB-B | clock boards |
| ISM-A, ISM-B | input selection modules |
| TU-A, TU-B | timing units |
| OSM-A, OSM-B | output selector modules |
| CE-A, CE-B | control elements |
| FDP-A, FDP-B | failure detection circuits |
| CSM | clock slave module |
| DC-A, DC-B | drop clock circuits |
| BD-A, BD-B | bus drivers |
| O1, O2 | clock distribution branches |
| SW | switchover module |
| SW-A, SW-B | first and second circuit parts |
| PD-A, PD-B | pads |
| PD2-A, PD2-B | pads |
| TSTP-A, TSTP-B | time serious transfer protocol generation circuits |

REDUNDANT SYNCHRONOUS CLOCK DISTRIBUTION SYSTEM

BACKGROUND OF TH INVENTION

The invention is based on a priority application EP 04 293 126.1 which is hereby incorporated by reference.

The present invention is directed to a redundant synchronous clock distribution system, comprising at least a first and a second clock module and first and second clock distribution branches adapted for synchronizing at least one clock slave module connected downstream to the redundant synchronous clock distribution system, wherein each of the first and second clock modules is adapted to act, in a master mode, as a master clock module for providing one of the clock distribution branches with an active clock signal, and adapted to act, in a slave mode, as a slave clock module for providing the respective other of the clock distribution branches with a standby clock signal.

In order to perform an effective data exchange in e.g. a telecommunication system or network, a control mechanism is necessary which allows for the data transmission to be compliant with certain defined data communication conventions. For example, data transmission in a telecommunications network may be performed synchronously or asynchronously. Telecommunication networks which work in interconnection with standardized communication networks such as PDH, SDH, or Sonet, usually require synchronization to assure the required signal quality at the data interface. In this context, redundant synchronous clock distribution systems are used to provide the required clock reference signal.

A redundant synchronous clock distribution system typically comprises two clock boards. One operates as the master clock board while the other operates as a slave clock board. Each of the clock boards has a plurality of reference clock inputs, each provisioning both clock modules with a certain reference clock signal. Both clock boards further comprise an input selector module that is adapted to select a reference clock signal from the plurality of reference clock signals provisioned at the inputs of the clock boards. Under software control both boards select a similar clock reference so that they both derive the same clock signal for provisioning a clean clock-signal to a number of to be synchronised clock slave modules such as a microprocessor board or telecom boards like there are line termination boards, route servers or switch matrix boards. Each input selector module of the boards subsequently is coupled to a timing unit, such as a Sonet timing unit, for generating a "clean" clock signal by jitter and wander clean-up and for provisioning hitless switchover of the selected clock signal. Furthermore each of the clock boards comprises an output selector module for selecting the "clean" clock signal from either clock board A or clock board B. Both clock boards select one and the same of both "clean" clock signals for provisioning the clock signal to the to be clock slave modules. This is usually performed under software control. The clock board that selects its own "clean" clock signal is called the master clock board, while the clock board that selects the "clean" clock signal from the other board is called the slave clock board.

In such redundant synchronous clock distribution system, where all distributed clocks originate from the same clock source, in case of failure of the master clock, a switchover of the clock source in the master and the slave clock distribution board must be performed.

In existent systems, consistency of the output clock selection multiplexers is controlled by software by means of master and slave states. The latency of the software and the communication between the two redundant clock boards will in some cases exceed the maximum allowed time. This is especially true after a switch over from external references while the clock board's PLLs are locking onto the new clock reference. Due to the very low cut off frequency seen in, e.g., Stratum 3, and better clock systems, the time until the differential wander between the PLLs present on each board is sufficiently small to perform a safe multiplexer switch over under software control can take up to several hours after the external reference (or reference phase, or frequency jump, or phase build out) switches over. If this time gets too long, the differential wander causes the system to go down.

An object of the present invention is to provide a redundant synchronous clock distribution system which can provide an improved switchover behaviour in order to improve the availability performance of the clock distribution system.

This object is solved by a redundant synchronous clock distribution system according to claim 1.

SUMMARY OF THE INVENTION

The redundant synchronous clock distribution system according to the invention comprises at least a first and a second clock module, wherein the first and second clock distribution branches are adapted for synchronizing at least one clock slave module connected downstream to the redundant synchronous clock distribution system. Each of the first and second clock modules are adapted to act, in a master mode, as a master clock module for providing one of the clock distribution branches with an active clock signal, and adapted to act, in a slave mode, as a slave clock module for providing the respective other of the clock distribution branches with a standby clock signal. Moreover, a clock switchover module is provided which is adapted to switch each of the first and second clock modules to change between the master mode and the slave mode, wherein the clock switchover module comprises a flip-flop-circuit having a first circuit part and a second circuit part. The first circuit part of the flip-flop-circuit is located on the first clock module and the second circuit part of the flip-flop-circuit is located on the second clock module.

According to the invention, the switchover of the clock source in the master and the slave clock distribution boards in case of failure is thus handled by making use of switching an enhanced distributed flip-flop-circuit, wherein advantageously the first and second circuit parts each comprise one half of the flip-flop-circuit, and the two halves of the flip-flop-circuit are each located on one of the master and slave clock modules. With such switchover mechanism according to the invention, neither complex software nor complex hardware is required. Furthermore, temporary system performance degradation during clock failure may be avoided. Thus, the redundant synchronous clock distribution system according to the invention can easily provide a safe, fast and consistent switchover.

Further advantageous features, aspects and details of the invention are evident from the dependent claims.

The invention will be better understood by reference to the following description of embodiments of the invention taken in conjunction with the accompanying drawings.

BRIEF DESCRIPTION OF THE DRAWINGS

Figure 1:
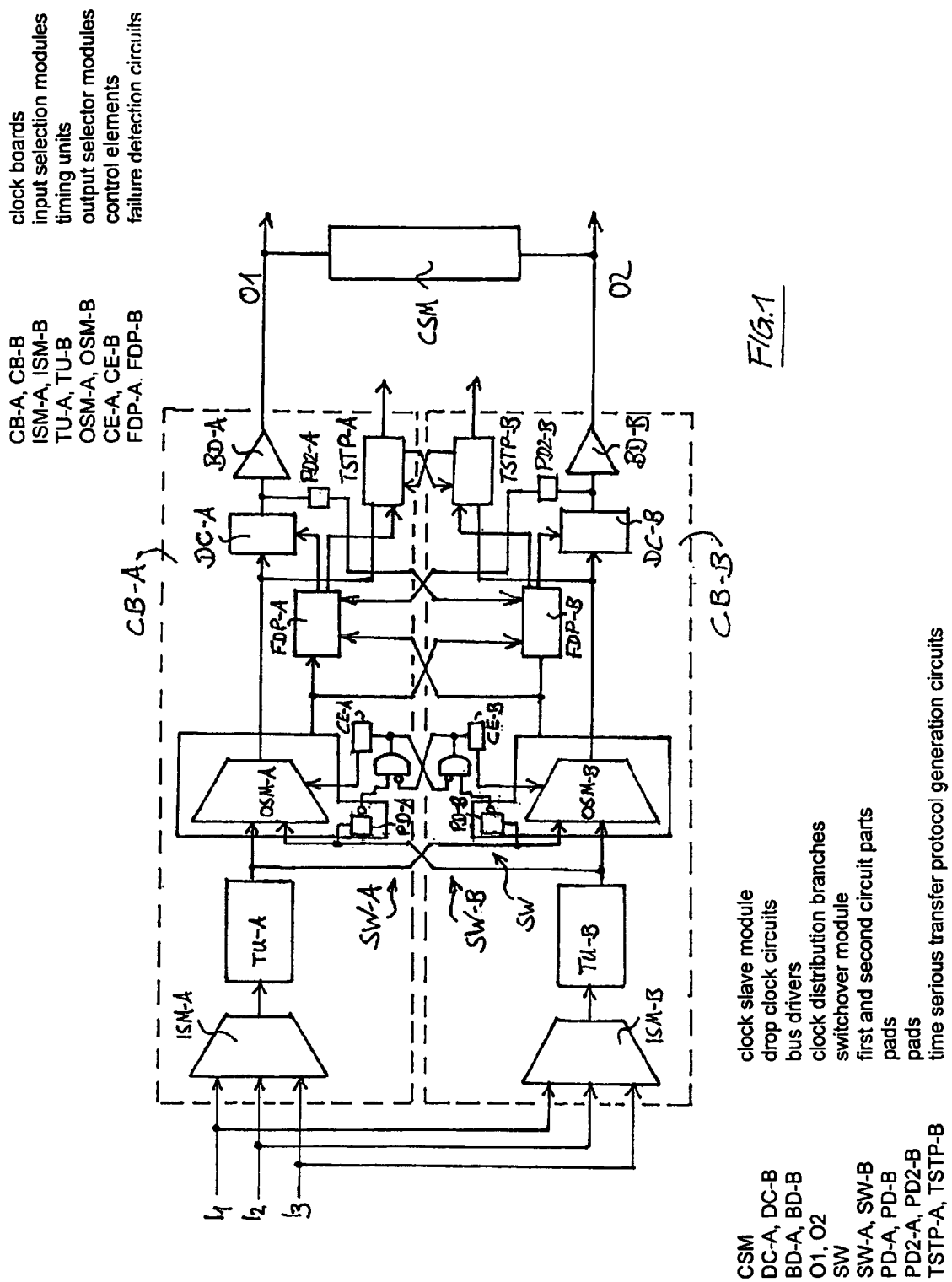
FIG. 1 illustrates an embodiment of a redundant synchronous clock distribution system of the present invention.

FIG. 1 depicts a preferred embodiment of a redundant synchronous clock distribution system of the present invention. The main elements of the redundant synchronous clock distribution system of FIG. 1 are the two clock boards CB-A, CB-B. First and second clock distribution branches O1, O2 are adapted for synchronizing at least one clock slave module CSM (or multiple clock slave modules) connected downstream to the branches O1, O2 of the redundant synchronous clock distribution system. Each of the clock modules CB-A, CB-B is adapted to act, in a master mode, as a master clock module for providing one of the clock distribution branches O1, O2 with an active clock signal, and adapted to act, in a slave mode, as a slave clock module for providing the respective other of the clock distribution branches O1, O2 with a standby clock signal.

In operation of the circuit embodiment of FIG. 1, clock board CB-A is acting as a master for provisioning an active clock to the first clock distribution branch O1, and clock board CB-B is acting as a slave for provisioning a standby clock to the second clock distribution branch O2, the first and second clock distribution branches being used for synchronizing the clock slave module CSM and/or further clock slave modules connected downstream which are not shown in FIG. 1.

The clock board CB-A comprises an input selection module ISM-A for selecting a clock reference from the plurality of reference clock signals provisioned at the inputs of the clock boards. The clock board further comprises a timing unit TU-A, such as a sonet timing unit, for generating a "clean" clock signal by jitter and wander clean-up and for provisioning hitless switchover of the selected clock signal. Furthermore, the clock board comprises an output selector module OSM-A for selecting the "clean" clock signal from either clock board CB-A or clock board CB-B. The output selector module OSM-A includes one or more PLLs which are not shown in FIG. 1 and acts as a MPSR (multipath self-routing) compliant switch. A control element, CE-A and CE-B, present on each of the clock boards, configures the output selector modules OSM-A and OSM-B in a way that both clock boards select one and the same of both "clean" clock signals for provisioning the clock signal to the clock slave module CSM. The clock board that selects its own "clean" clock signal is called the master clock board, while the clock board that selects the "clean" clock signal from the other board is called the slave clock board. The clock board additionally comprises a failure detection circuit FDP-A that is adapted to detect amongst others a Bi-master/Bi-slave failure of the output selection module OSM-A of the clock board CB-A based on status information of the output selection module OSM-A. The clock board further comprises a drop clock circuit DC-A which drops the clock on branch O1 based on information of the failure detection circuit FDP-A. Reference sign BD-A denotes respective bus drivers on branch O1. Signals provided to bus drivers BD-A are also provided via pad PD2-A to the failure detection part FDP-B of clock board CB-B. A time serious transfer protocol generation circuit TSTP-A is connected to branch O1 for receiving a reference signal and to the failure detection circuit FDP-A for receiving the master or slave status and acts for time stamp generation in connection with to be transmitted data packets. Time serious transfer protocol generation circuit TSTP-A is synchronized with time serious transfer protocol generation circuit TSTP-B of clock board CB-B. Clock board CB-B has the same structure as clock board CB-A and, therefore, comprises corresponding components denoted with index "-B" which interact with the respective components of clock board CB-A as shown in FIG. 1.

In order to explain the operation of the system of FIG. 1 it is assumed that the redundant synchronous clock distribution system typically comprises two clock boards, CB-A and CB-B. One operates as the master clock board while the other operates as a slave clock board. Each of the clock boards has a plurality of reference clock inputs, each provisioning both clock modules with a certain reference clock signals I1 to I3. The input selection module ISM-A, ISM-B of both clock boards selects a certain reference clock signal from the plurality of reference clock signals provisioned at the inputs of the clock boards. Under software control both boards select a similar clock reference so that they both derive the same clock signal for provisioning a "clean" clock-signal to a number of to be synchronised clock slave modules such as a microprocessor board or telecom boards like there are line termination boards, route servers or switch matrix boards. Then the timing units TU-A, TU-B both generate a "clean" clock signal by jitter and wander clean-up of the clock signal provided by the input selector modules and for provisioning hitless switchover of the selected clock signal. Then, it is assumed that the output selector modules OSM-A, OSM-B both select the "clean" clock signal from clock board CB-A. This selection is performed under software control.

Clock boards CB-A, CB-B further comprise a clock switchover module SW adapted to switch each of the clock modules CB-A, CB-B to change between the master mode and the slave mode. The clock switchover module SW comprises a flip-flop-circuit, which is explained in greater detail with reference to FIG. 2, having a first circuit part SW-A and a second circuit part SW-B. According to the present embodiment, the flip-flop-circuit is configured as a Reset-Set (RS) flip-flop-circuit. The first circuit part SW-A of the flip-flop-circuit is located on the first clock module CB-A, and the second circuit part SW-B of the flip-flop-circuit is located on the second clock module CB-B. The switchover module SW is connected to the control elements CE-A and CE-B and receives respective signals derived from the clock branches O1, O2 via pads PD-A, PD-B as a part of the output selector modules OSM-A, OSM-B, as shown in FIG. 1.

Figure 2:
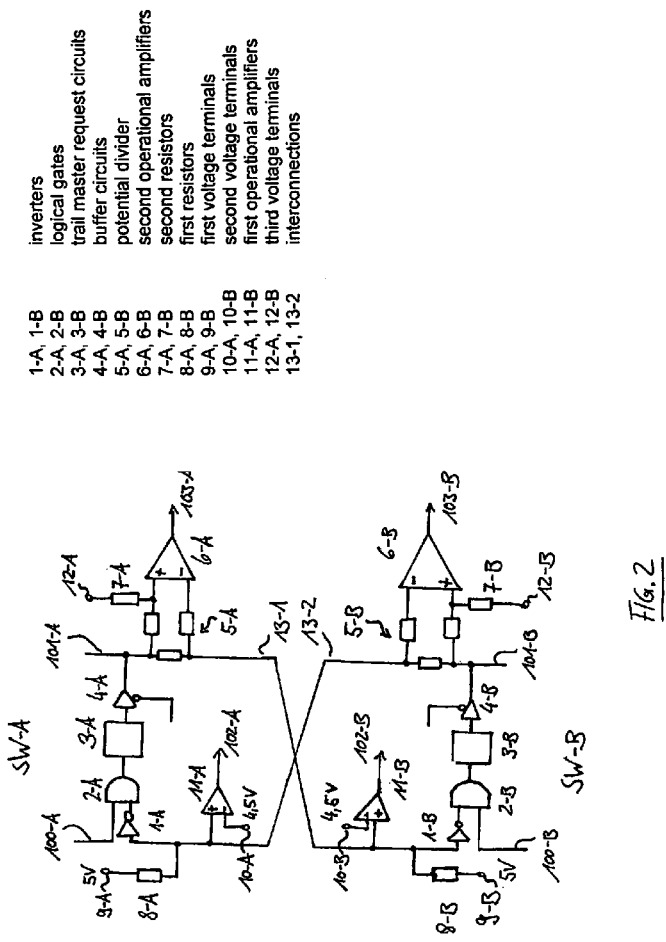
FIG. 2 illustrates an embodiment of a switchover circuit in the redundant synchronous clock distribution system of FIG. 1.

Referring now to FIG. 2, which illustrates an embodiment of a switchover circuit in the redundant synchronous clock distribution system of FIG. 1, the first circuit part SW-A of the flip-flop-circuit comprises a first logical gate 2-A (in this embodiment an AND-gate) having a first input adapted to receive a first request signal 100-A which indicates a demand to change between the master mode and the slave mode. For example, the signal 100-A indicates as a negatived signal a request to become a master. The logical gate 2-A further has a second input coupled to the second circuit part SW-B of the flip-flop-circuit via an interconnection 13-2 and an inverter 1-A. The logical gate 2-A has an output adapted to output a first command signal 101-A which indicates the current master or slave status of the first clock module CB-A. For example, signal 101-A indicates the status "I'm slave" and the negatived status of "I'm master".

The second circuit part SW-B of the flip-flop-circuit comprises a second logical gate 2-B (in this embodiment an AND-gate) having a first input adapted to receive a second request signal 100-B which indicates a demand to change between the master mode and the slave mode. The logical gate 2-B further has a second input coupled to the first circuit part SW-A of the flip-flop-circuit via an interconnection 13-1 and an inverter 1-B. The logical gate 2-B has an output adapted to output a second command signal 101-B which indicates the current master or slave status of the second clock module. For example, the signal indications of signals 100-B and 101-B correspond to that of signals 100-A and 101-A, respectively.

In the preferred embodiment of FIG. 2, the switchover module SW is provided with a first detection circuit for each of the clock modules CB-A, CB-B which is adapted to detect a floating or open interconnection 13-1, 13-2 between the first and the second circuit parts SW-A, SW-B of the flip-flop-circuit. In particular, the first detection circuit of each clock module comprises a first resistor 8-A, 8-B (e.g. 1 k) and a first operational amplifier 11-A, 11-B. A to be detected interconnection 13-1, 13-2 is coupled to a first voltage terminal 9-A, 9-B via the resistor 8-A, 8-B and to a first input (the non-inverting input) of the operational amplifier 11-A, 11-B. The operational amplifier 11-A, 11-B has a second input (the inverting input) coupled to a second voltage terminal 10-A, 10-B. The operational amplifier 11-A, 11-B has an output adapted to output a detection signal 102-A, 102-B of the first detection circuit, which indicates the state when the corresponding interconnection 13-1, 13-2 is open or floating and when the mate clock board is not active.

In a further preferred embodiment, the switchover module SW is provided with a second detection circuit for each of the clock modules CB-A, CB-B which is adapted to detect a short-circuited interconnection 13-1, 13-2 between the first and the second circuit parts SW-A, SW-B of the flip-flop-circuit. In particular, the second detection circuit comprises, for each of the clock modules CB-A, CB-B, a potential divider 5-A, 5-B, a second operational amplifier 6-A, 6-B, and a second resistor 7-A, 7-B (e.g. 681 k; the resistors of the potential dividers coupled to the inputs of the operational amplifier have values of e.g. 22 k, and the resistor coupled into interconnection 13-1, 13-2 a value of e.g. 50 R). The potential divider 5-A, 5-B is coupled into a to be detected interconnection 13-1, 13-2, wherein the potential divider has a first output coupled to a first input (the non-inverting input) of the operational amplifier 6-A, 6-B, and a second output coupled to a second input (the inverting input) of the operational amplifier 6-A, 6-B. The first input of the operational amplifier 6-A, 6-B is coupled to a third voltage terminal 12-A, 12-B via the resistor 7-A, 7-B. The operational amplifier 6-A, 6-B has an output adapted to output a detection signal 103-A, 103-B of the second detection circuit, which indicates the state when the corresponding interconnection 13-1, 13-2 is short-circuited to ground. This signal is only valid in a respective master state. Thus, the distributed flip-flop is protected to open or short-circuited interconnections that force the flip-flop into a certain state.

According to a further embodiment, the flip-flop-circuit comprises a respective trail master request circuit 3-A, 3-B adapted to compensate for a signal delay of signals transmitted between the first and second circuit parts SW-A, SW-B of the distributed flip-flop-circuit to prevent output signal oscillations of the flip-flop-circuit. In particular, the trail master request circuit 3-A, 3-B compensates for the two cable delays which are generated during the signal turn-around via the interconnections 13-1, 13-2, i.e. aligns the respective signal edges at gates 2-A, 2-B. Such oscillations are common to flip flops where the request is shorter than the turn-around time.

Moreover, the flip-flop-circuit preferably provides for a buffer circuit 4-A, 4-B with life insertion capability adapted to provide a predetermined signal status when a clock module CB-A, CB-B is inserted. The use of a standard buffer with life insertion capability (i.e. High-Z when not powered) avoids false switch over in the master board when a slave board is inserted/extracted.

Thus, the redundant synchronous clock distribution system according to the invention provides for a safely implemented active/stand-by switchover between two redundant clock modules of a clock distribution system which therefore meets the demands of a high availability. The protected distributed flip-flop can easily guarantee a safe, fast and consistent switchover.

| Reference signs | |
|---|---|
| CB-A, CB-B | clock module |
| ISM-A, ISM-B | input selection module |
| TU-A, TU-B | timing unit |
| OSM-A, OSM-B | output selector module |
| CE-A, CE-B | control element |
| FDP-A, FDP-B | failure detection circuit |
| CSM | clock slave module |
| DC-A, DC-B | drop clock circuit |
| BD-A, BD-B | bus driver |
| O1, O2 | clock distribution branch |
| SW | switchover module |
| SW-A, SW-B | circuit parts of switchover module |
| PD-A, PD-B | pad |
| PD2-A, PD2-B | pad |
| TSTP-A, TSTP-B | time serious transfer protocol generation circuit |
| 1-A, 1-B | inverter |
| 2-A, 2-B | logical gate |
| 3-A, 3-B | trail master request circuit |
| 4-A, 4-B | buffer circuit |
| 5-A, 5-B | potential divider |
| 6-A, 6-B | operational amplifier |
| 7-A, 7-B | resistor |
| 8-A, 8-B | resistor |
| 9-A, 9-B | voltage terminal |
| 10-A, 10-B | voltage terminal |
| 11-A, 11-B | operational amplifier |
| 12-A, 12-B | voltage terminal |
| 13-1, 13-2 | interconnection |
| 100-A, 100-B | request signal |
| 101-A, 101-B | command signal |
| 102-A, 102-B | output signal |
| 103-A, 103-B | output signal |

The invention claimed is:

1. A redundant synchronous clock distribution system, comprising:
   at least first and second clock modules,
   first and second clock distribution branches adapted for synchronizing at least one clock slave module connected downstream to the redundant synchronous clock distribution system,
   each of the first and second clock modules adapted to act, in a master mode, as a master clock module for providing one of said clock distribution branches with an active clock signal, and adapted to act, in a slave mode, as a slave clock module for providing the respective other of said clock distribution branches with a standby clock signal,
   a clock switchover module adapted to switch each of the first and second clock modules to change between the master mode and the slave mode,
   wherein said clock switchover module comprises a flip-flop-circuit having a first circuit part and a second circuit part,
   said first circuit part of said flip-flop-circuit located on said first clock module and said second circuit part of said flip-flop-circuit located on said second clock module,
   wherein said first circuit part of said flip-flop-circuit comprises a first logical gate, said first logical gate having a first input adapted to receive a first request signal which indicates a demand to change between the master mode and the slave mode, said first logical gate having a second input coupled to said second circuit part of the flip-flop-circuit, said first logical gate having an output adapted to output a first command signal which indicates the current master or slave status of the first clock module.

2. The redundant synchronous clock distribution system according to claim 1, wherein said flip-flop-circuit is configured as a Reset-Set flip-flop-circuit.

3. A redundant synchronous clock distribution system, comprising:

at least first and second clock modules, first and second clock distribution branches adapted for synchronizing at least one clock slave module connected downstream to the redundant synchronous clock distribution system, each of the first and second clock modules adapted to act, in a master mode, as a master clock module for providing one of said clock distribution branches with an active clock signal, and adapted to act, in a slave mode, as a slave clock module for providing the respective other of said clock distribution branches with a standby clock signal, a clock switchover module adapted to switch each of the first and second clock modules to change between the master mode and the slave mode, wherein said clock switchover module comprises a flip-flop-circuit having a first circuit part and a second circuit part, said first circuit part of said flip-flop-circuit located on said first clock module and said second circuit part of said flip-flop-circuit located on said second clock module, wherein said second circuit part of said flip-flop-circuit comprises a second logical gate, said second logical gate having a first input adapted to receive a second request signal which indicates a demand to change between the master mode and the slave mode, said second logical gate having a second input coupled to the first circuit part of the flip-flop-circuit, said second logical gate having an output adapted to output a second command signal which indicates the current master or slave status of the second clock module.

4. The redundant synchronous clock distribution system according to claim 3, wherein said flip-flop-circuit is configured as a Reset-Set flip-flop-circuit.

5. A redundant synchronous clock distribution system, comprising:

at least first and second clock modules, first and second clock distribution branches adapted for synchronizing at least one clock slave module connected downstream to the redundant synchronous clock distribution system, each of the first and second clock modules adapted to act, in a master mode, as a master clock module for providing one of said clock distribution branches with an active clock signal, and adapted to act, in a slave mode, as a slave clock module for providing the respective other of said clock distribution branches with a standby clock signal, a clock switchover module adapted to switch each of the first and second clock modules to change between the master mode and the slave mode, wherein said clock switchover module comprises a flip-flop-circuit having a first circuit part and a second circuit part, said first circuit part of said flip-flop-circuit located on said first clock module and said second circuit part of said flip-flop-circuit located on said second clock module, wherein said switchover module is provided with a first detection circuit which is adapted to detect a floating or open interconnection between the first and the second circuit parts of the flip-flop-circuit.

6. The redundant synchronous clock distribution system according to claim 5, wherein the first detection circuit comprises a first resistor and a first operational amplifier, a first voltage terminal, and a second voltage terminal, a to be detected interconnection coupled to the first voltage terminal via the first resistor and to a first input of the first operational amplifier, the first operational amplifier having a second input coupled to the second voltage terminal, the first operational amplifier having an output adapted to output a detection signal of the first detection circuit.

7. The redundant synchronous clock distribution system according to claim 5, wherein said flip-flop-circuit is configured as a Reset-Set flip-flop-circuit.

8. A redundant synchronous clock distribution system, comprising:

at least first and second clock modules, first and second clock distribution branches adapted for synchronizing at least one clock slave module connected downstream to the redundant synchronous clock distribution system, each of the first and second clock modules adapted to act, in a master mode, as a master clock module for providing one of said clock distribution branches with an active clock signal, and adapted to act, in a slave mode, as a slave clock module for providing the respective other of said clock distribution branches with a standby clock signal, a clock switchover module adapted to switch each of the first and second clock modules to change between the master mode and the slave mode, wherein said clock switchover module comprises a flip-flop-circuit having a first circuit part and a second circuit part, said first circuit part of said flip-flop-circuit located on said first clock module and said second circuit part of said flip-flop-circuit located on said second clock module, wherein said switchover module is provided with a second detection circuit which is adapted to detect a short-circuited interconnection between the first and the second circuit parts of the flip-flop-circuit.

9. The redundant synchronous clock distribution system according to claim 8, wherein the second detection circuit comprises a potential divider, a second operational amplifier, a second resistor, and a third voltage terminal, the potential divider coupled into a to be detected interconnection, the potential divider having a first output coupled to a first input of the second operational amplifier, and having a second output coupled to a second input of the second operational amplifier, the first input of the second operational amplifier coupled to the third voltage terminal via the second resistor, the second operational amplifier having an output adapted to output a detection signal of the second detection circuit.

10. The redundant synchronous clock distribution system according to claim 8, wherein said flip-flop-circuit is configured as a Reset-Set flip-flop-circuit.

11. A redundant synchronous clock distribution system, comprising:
at least first and second clock modules,
first and second clock distribution branches adapted for synchronizing at least one clock slave module connected downstream to the redundant synchronous clock distribution system,
each of the first and second clock modules adapted to act, in a master mode, as a master clock module for providing one of said clock distribution branches with an active clock signal, and adapted to act, in a slave mode, as a slave clock module for providing the respective other of said clock distribution branches with a standby clock signal,
a clock switchover module adapted to switch each of the first and second clock modules to change between the master mode and the slave mode,
wherein said clock switchover module comprises a flip-flop-circuit having a first circuit part and a second circuit part,
said first circuit part of said flip-flop-circuit located on said first clock module and said second circuit part of said flip-flop-circuit located on said second clock module,
wherein the flip-flop-circuit comprises a trail master request circuit adapted to compensate for a signal delay of signals transmitted between the first and second circuit parts of the flip-flop-circuit to prevent output signal oscillations of the flip-flop-circuit.

12. The redundant synchronous clock distribution system according to claim 11, wherein said flip-flop-circuit is configured as a Reset-Set flip-flop-circuit.

13. A redundant synchronous clock distribution system, comprising:
at least first and second clock modules,
first and second clock distribution branches adapted for synchronizing at least one clock slave module connected downstream to the redundant synchronous clock distribution system,
each of the first and second clock modules adapted to act, in a master mode, as a master clock module for providing one of said clock distribution branches with an active clock signal, and adapted to act, in a slave mode, as a slave clock module for providing the respective other of said clock distribution branches with a standby clock signal,
a clock switchover module adapted to switch each of the first and second clock modules to change between the master mode and the slave mode,
wherein said clock switchover module comprises a flip-flop-circuit having a first circuit part and a second circuit part,
said first circuit part of said flip-flop-circuit located on said first clock module and said second circuit part of said flip-flop-circuit located on said second clock module,
wherein the flip-flop-circuit provides for a buffer circuit with life insertion capability adapted to provide a pre-determined signal status when a clock module is inserted.

14. The redundant synchronous clock distribution system according to claim 13, wherein said flip-flop-circuit is configured as a Reset-Set flip-flop-circuit.

* * * * *